US010566028B1

(12) United States Patent
Nijim et al.

(10) Patent No.: US 10,566,028 B1
(45) Date of Patent: Feb. 18, 2020

(54) DIGITAL VIDEO RECORDER FAILOVER

(71) Applicant: Cox Communications, Inc., Atlanta, GA (US)

(72) Inventors: Yousef Wasef Nijim, Cumming, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/237,682

(22) Filed: Aug. 16, 2016

(51) Int. Cl.
| | | |
|---|---|---|
| *G11B 27/36* | (2006.01) | |
| *H04N 21/4147* | (2011.01) | |
| *H04N 21/482* | (2011.01) | |
| *H04N 21/442* | (2011.01) | |
| *H04N 21/21* | (2011.01) | |
| *H04N 21/214* | (2011.01) | |
| *H04N 21/218* | (2011.01) | |
| *H04N 21/20* | (2011.01) | |

(52) U.S. Cl.
CPC ............ *G11B 27/36* (2013.01); *H04N 21/20* (2013.01); *H04N 21/21* (2013.01); *H04N 21/214* (2013.01); *H04N 21/218* (2013.01); *H04N 21/2181* (2013.01); *H04N 21/4147* (2013.01); *H04N 21/442* (2013.01); *H04N 21/4821* (2013.01)

(58) Field of Classification Search
None
See application file for complete search history.

(56) References Cited

U.S. PATENT DOCUMENTS

| | | | | |
|---|---|---|---|---|
| 2003/0219228 A1* | 11/2003 | Thiagarajan | ............. | H04N 5/76 386/265 |
| 2004/0113929 A1* | 6/2004 | Matsuzaki | ............. | H04H 40/09 715/700 |
| 2007/0276925 A1 | 11/2007 | La Joie et al. | | |
| 2008/0275974 A1 | 11/2008 | Rackiewicz | | |
| 2009/0010610 A1* | 1/2009 | Scholl | .................. | G11B 27/105 386/314 |
| 2010/0043030 A1* | 2/2010 | White | .................. | G11B 27/105 725/58 |
| 2011/0173665 A1* | 7/2011 | Shim | ...................... | H04H 60/06 725/46 |
| 2012/0151528 A1* | 6/2012 | Mathews | ........... | H04N 21/2355 725/41 |
| 2014/0068684 A1* | 3/2014 | Mehta | ................ | H04N 21/2343 725/93 |

(Continued)

*Primary Examiner* — Justin E Shepard
(74) *Attorney, Agent, or Firm* — Merchant & Gould P.C.

(57) ABSTRACT

Aspects of the present disclosure provide for systems and methods that provide automatic failure options from a primary recording and/or playback device/system to a backup recording and/or playback system, but are not so limited. A disclosed system operates to failover to one or more of a backup cDVR system and/or local DVR device/ system when a primary recording and/or playback device/ system is inoperable or otherwise inaccessible. A method of an embodiment operates to automatically failover to a backup DVR device/system upon detecting a failure mode associated with a primary DVR device/system, wherein the automatic failover includes synchronizing one or more content items and/or one or more content items playlists associated with the backup DVR device/system and the primary DVR device/system.

20 Claims, 8 Drawing Sheets

(56) References Cited

U.S. PATENT DOCUMENTS

| | | |
|---|---|---|
| 2014/0282772 A1 | 9/2014 | Chen et al. |
| 2014/0282786 A1* | 9/2014 | Lajoie ................ H04N 21/2743 725/115 |
| 2015/0026125 A1* | 1/2015 | Sharma ............. G06F 17/30581 707/623 |
| 2015/0205657 A1* | 7/2015 | Clark .................... G06F 11/008 714/47.3 |
| 2015/0312616 A1* | 10/2015 | Smith ............. H04N 21/23106 725/93 |
| 2016/0360282 A1* | 12/2016 | Graham ............. H04N 21/6334 |

* cited by examiner

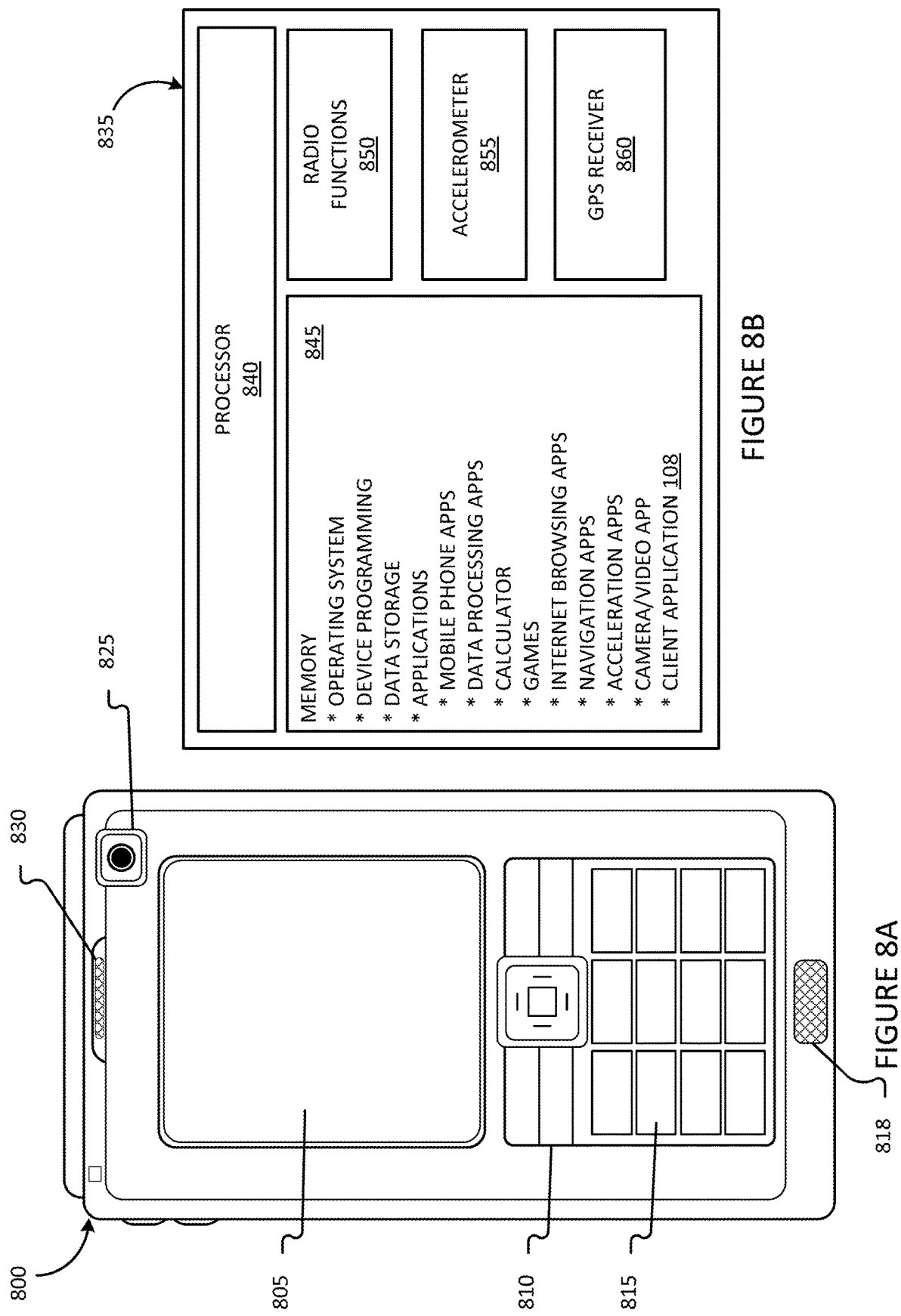

US 10,566,028 B1

DIGITAL VIDEO RECORDER FAILOVER

BACKGROUND

Cable and satellite television allow subscribers to record linear content items to watch at a more convenient time. However, not all subscribers have access to a digital video recorder (DVR) or a personal video recorder (PVR). A cloud-based digital video recorder (cDVR) enables subscribers to store content in the cloud and does not require installation of a dedicated DVR or PVR at a residential or business location. Because content is stored in the cloud, subscribers can access stored content from multiple locations and/or multiple devices.

DVRs and PVRs use one or more hard disk drives for mass storage of content. Hard drives include spinning disks or platters that rotate at high rates of speed (e.g. 5400 rpm, 7200 rpm, etc.). Unfortunately, hard drives are prone to failure which may result in an associated DVR or PVR being inoperable for recording and/or playing back content. One hard drive failure type involves bad sectors that may result in read/write errors. Bad sectors may require replacing an associated hard drive; whereas read/write errors may be corrected by formatting an associated hard drive. Another type of failure involves a complete hard drive failure, such as a mechanical failure for example, where the hard drive is no longer recognizable to an associated DVR and/or external computer.

SUMMARY

Aspects of the present disclosure provide for systems and methods that provide automatic failover options from a primary recording and/or playback device/system to a backup recording and/or playback device/system, but are not so limited. A system of an embodiment operates to failover to one or more of a backup cDVR system and/or a local DVR device/system when a primary recording and/or playback device/system is inoperable or otherwise inaccessible. A method of an embodiment operates to automatically failover to a backup DVR device/system upon detecting a failure mode associated with a primary DVR device/system, wherein the automatic failover includes synchronizing one or more content items and/or one or more content items playlists associated with the backup DVR device/system and the primary DVR device/system.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views:

FIGS. 8A-8B illustrate a suitable mobile computing environment with which embodiments may be practiced.

DETAILED DESCRIPTION

Figure 1:
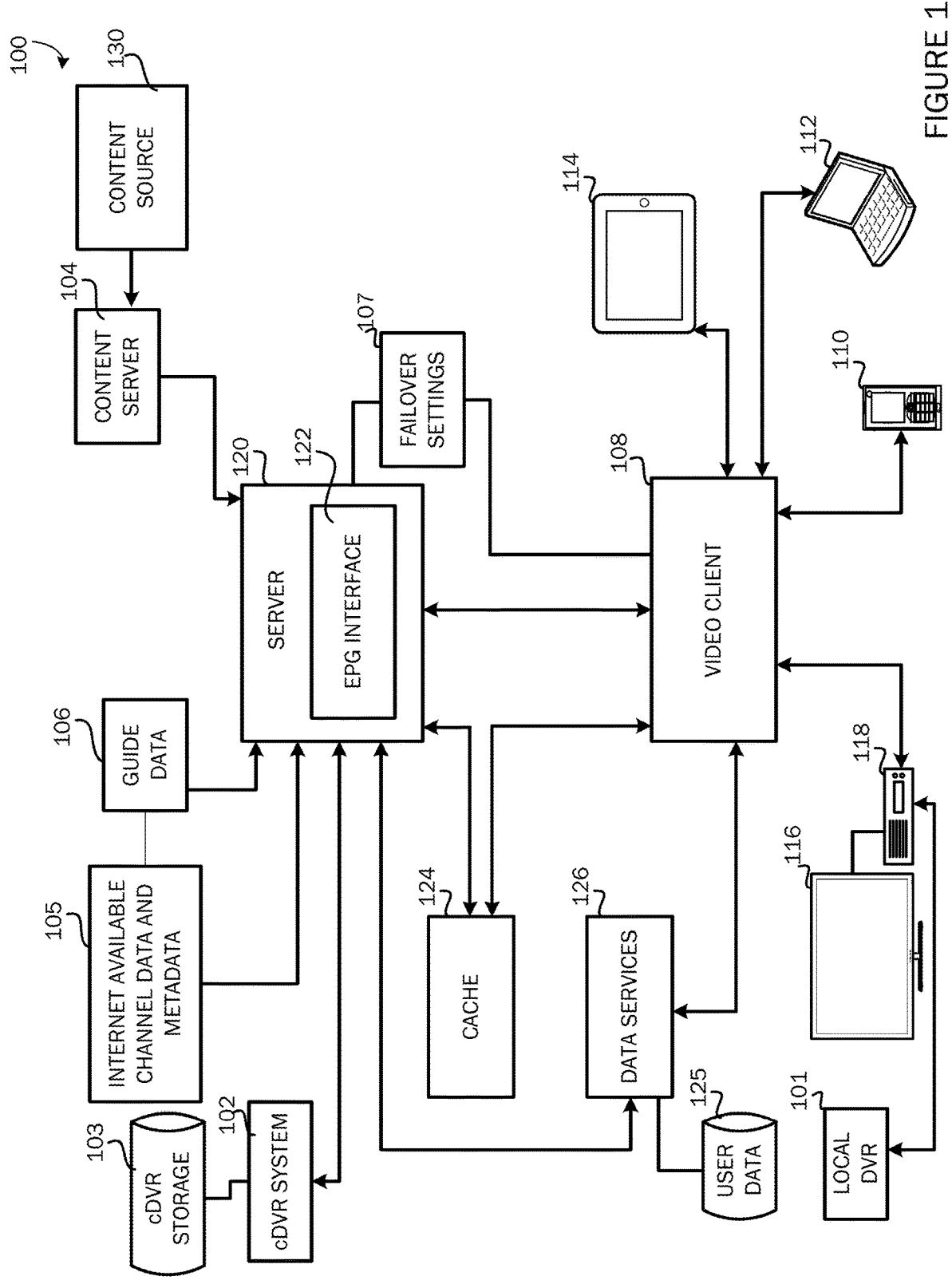
FIG. 1 is a block diagram of a system that enables users to record content items and/or playback recorded content items using one or more of a local digital video recorder and/or a cDVR system in accordance with an embodiment.

FIG. 1 is a block diagram of a system 100 that enables users to record content items (e.g., television programming) and/or playback recorded content items using one or more of a local digital video recorder (DVR) 101 and/or a cloud-based or network-based DVR system (cDVR) 102, but is not so limited, As described below, the system 100 is configured to provide automatic failover options to failover from a primary recording and/or playback device/system to a backup recording and/or playback device/system. For example, the system 100 can use the automatic failover options to failover to a backup local DVR 101 and/or backup cDVR system 102 when a primary recording and playback device/system is unable to provide recording and/or playback operations. As an example, upon detecting a hard drive failure, sector failure, and/or some other issue that affects playback and/or recording operations, the system 100 can operate to failover from a local and/or remote DVR system to a backup local and/or remote DVR system and resume playback and/or recording operations from one or more backup devices/systems.

An exemplary local DVR 101 can be a set-top box (STB) based DVR or a standalone DVR that includes local hard drive disk storage. The local DVR 101 may also be configured as a home gateway that includes local hard drive disk storage for an entire household or business location. The home gateway operates to communicate with other coupled devices including additional STBs distributed throughout a home or business network.

As described below, the system 100 is configured to failover to a backup recording and/or playback device/system when a primary recording and/or playback device/system becomes inoperable or otherwise unable to perform a record operation, play operation, and/or some other issue that adversely affects the operation of the primary recording and/or playback device/system occurs. For example, local DVR 101 may be designated as a primary recording and/or playback device/system and cDVR 102 may be designated as a backup recording and/or playback device/system. If local DVR 101 is unable to perform recording and/or playback operations, the system 100 can automatically failover to and use cDVR system 102 for recording and/or playback operations.

As shown in FIG. 1, cDVR system 102 is communicatively coupled to cDVR storage 103. As an example, cDVR system 102 can store and deliver cloud-based DVR content in multiple formats to an IPTV environment, a legacy QAM system, an IP video system via a Content Delivery Network (CDN) and/or to a hybrid system with both QAM and IP devices. In an embodiment, cDVR storage 103 is configured as a redundant array (centralized and/or distributed) of computer readable storage devices (e.g., RAID or other mass storage devices). The cDVR system 102 provides improved reliability since the cDVR storage 103 can be setup as a redundant array of storage devices to prevent data loss due to a point of failure, such as a hard disk failure or some other failure type. As described below, if the local DVR 101 becomes inoperable for any reason, in real-time or near real-time, the system 100 can failover to the cDVR system 102 and continue to record content and/or playback recorded content while video client 108 is communicating with application server 120 and/or cDVR system 102.

As shown in FIG. 1, and in accordance with an embodiment, server 120 includes an electronic program guide (EPG) interface 122. EPG interface 122 utilizes guide data (and/or metadata) 106 in part to provide a personalized EPG layout to display on an endpoint device, such as TV 116, tablet 114, mobile device 110, laptop 112, etc. According to various embodiments, EPG interface 122 can also be included as part of an endpoint device or other component, such as video client 108, STB 118, etc. When video client 108 is recording content to or playing content from local DVR 101, a distinct user interface (UI) may be provided that includes content items stored at local DVR 101. When video client 108 is recording content to or playing content from cDVR system 102, a distinct UI may be provided or the same interface may be utilized with respect to local DVR 101. As described below, recorded content item playlists may be synchronized so that content titles stored at local DVR 101 are also stored at or linked to cDVR storage 103.

According to an embodiment, application server 120 can operate to maintain cDVR storage 103 such that the same content items that are stored at local DVR 101 are also stored at cDVR storage 103. Accordingly, when local DVR 101 is unable to perform a playback operation for a particular content item, the application server 120 can pull the same content item from cDVR storage 103 for playback by the video client 108. Likewise, when cDVR system 102 is unable to perform a playback operation for a particular content item, the application server 120 can transmit the content items to the local DVR 101 for playback by the video client 108.

Components of the system 100 may operate as a distributed system where each component is accessed via a suitable network, or the components may operate together as an integrated system. As illustrated, Internet-available channel data and metadata 105, content server 104, guide data 106, etc. may be provided and used to convey programming and/or other information to users of the system 100. Content server 104 may include video content data and metadata available via a service provider, such as cable television (CATV) services system (as illustrated and described below with reference to FIG. 6), satellite television provider, etc. The data and metadata may include information such as video content titles, storylines, casts, genres, ratings, release dates, images, etc.

As described herein, a content source 130 can include linear and/or non-linear content available to the consumers via a service provider or other source, but is not so limited. For example, the broadcasts of television programs carried via the content server 104, which may be temporarily spooled on computer-readable storage media or directly transmitted over the physical network, from television networks are included as content sources 130. As will be appreciated, content that is described as "broadcast" will include content that is unicast (e.g., from a source to a caching location, between caching locations, and from a caching location to a consumer) as linear content.

Computers used in the recording and/or playback of content include processors and memory storage devices, which store instructions that when executed by the processors also enable failover operations associated with primary and/or backup recording and/or playback devices or systems. Memory storage devices are articles of manufacture that include computer-readable storage media. The term computer-readable storage media does not include transmission media, but refers to hardware media used to store desired information for access by a computer or processor. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Guide data 106 may include channel information, programming information, network information, etc. Electronic program guide (EPG) interface 122 can use the guide data 106 to generate an EPG display that includes a channel lineup, menu options for video on demand, DVR recordings/settings, etc. According to an embodiment, EPG interface 122 can be used to generate and/or convey failure mode messages when local DVR 101 and/or cDVR system 102 are inoperable or otherwise unavailable to provide recording and/or playback functions. For example, video client 108 may receive a failure mode message from local DVR 101 associated with a hard drive disk failure, wherein the EPG interface 122 or video client 108 can be used to convey the failure mode message to a user. According to an embodiment, the failure mode message can be used by the application server 120 to automatically failover to a backup recording and/or playback device/system, such as cDVR 102 for example. Local DVR 101 and/or cDVR system 102 are configured to store content item recordings when recording from a TV 116 connected to a STB 118, or may store the DVR recordings on an IP network when recording from IP enabled devices 110, 112, 114 respectively. STB 118 may also be configured with DVR functionality. A user can use the local DVR 101 or the cDVR system 102 to record and/or playback video content items, such as television programs, live broadcasts, and/or movies, for example.

Cache 124 can be used to store recorded content items and/or used as buffer. A recorded content item, associated channel/guide data, and/or, failover detection parameters (e.g., a time of failure, failure type, ID of failed device, etc.) may be cached in cache 124, a memory storage device, local DVR 101, cDVR storage 102, and/or some other component. The cache 124 is illustrated in FIG. 1 as a remote element, but may be integrated with the server 120, video client 108, local DVR 101, cDVR 102, etc. Failover settings 107 can be used by video client 108 and/or server 120 to determine when to failover to a backup recording and/or playback device/system and/or which device/system to failover to. Failover settings 107 can also be used to define a primary recording and or playback device/system including any redundant backup devices/systems. According to one embodiment, cached information may be specific to a user or user profile.

The system 100 may include a data services system 126 which may comprise information such as billing data, permissions and authorization data, user profile data, etc., which can be stored in a user database 125. The data services system 126 may be accessed by the server 120 for checking permissions, subscriptions, and/or profile data for associating channel, programming, guide data, cDVR availability, etc. for specific users. Various endpoint devices may be utilized to access video content that can use display technology to record, playback, and/or display a video content item. For example, embodiments can use any video decoding display device that uses one or more graphics processors to display a video content item, interactive menu, electronic program guide, etc. Exemplary endpoint devices can include, but are not limited to, a mobile communication device 110, such as a mobile phone, a computing device 112, such as a desktop computer, a laptop computer, etc., a wireless computing device, such as a tablet computing device 114, a television 116, such as an Internet-connected television or a television connected to a network-connected device, such as a STB 118, local DVR 101 cDVR 102 system, etc. The video client 108 can be integrated with one or more endpoint devices or other components of the system 100.

An example of the operation of the system 100 can be as follows. A user has recorded a live event on local DVR 101 and has started playback. During playback, a hard disk drive of the local DVR 101 fails which has been detected by internal diagnostic logic and/or circuitry of the local DVR 101, EPG interface 122, O/S component, etc. The internal diagnostic logic of one embodiment records a time, such as a playback time, recording time, or other recorded time at or about the time that a failure or other issue occurs that affects recording and/or playback operations. The recorded time can be used as part of the automatic failover process when failing over to one or more backup, devices/systems. For example, a DVR failover process can use a recorded time associated with a time of failure to automatically resume playback from at or near a playback or record time associated with the failure which may require less memory and processing resources to load only a portion of a recorded content item. As another example, a recorded time can be used to resume recording operations as part of a subsequent recording after experiencing a hardware and/or software error which may expend less memory and processing resources to record only a portion of a content item.

Continuing the example, if the cDVR system 102 is online and the user is authorized to use the cDVR system 102, server 120 is configured to automatically fail over from the local DVR 101 to the cDVR system 102 to resume playback of the recorded live event from the playback time at or about the time that the failure occurred. If the content item is not currently stored at cDVR storage 103, the server 120 can query content server 104 or another content source to locate and/or retrieve the content item for storing in and/or linking to cDVR storage 103. Server 120 can operate to retrieve and/or store content items from content server 104, content source 130, other third party sources, and/or other local and/or remote sources to cDVR storage 103 at any time, including at or about the same time as when a content item is stored at local DVR 101 or at some other storage location. By proactively storing content items at cDVR storage, a user may not experience any significant delay when failing over to and resuming playback operations from a backup recording and/or playback device/system.

Figure 2:
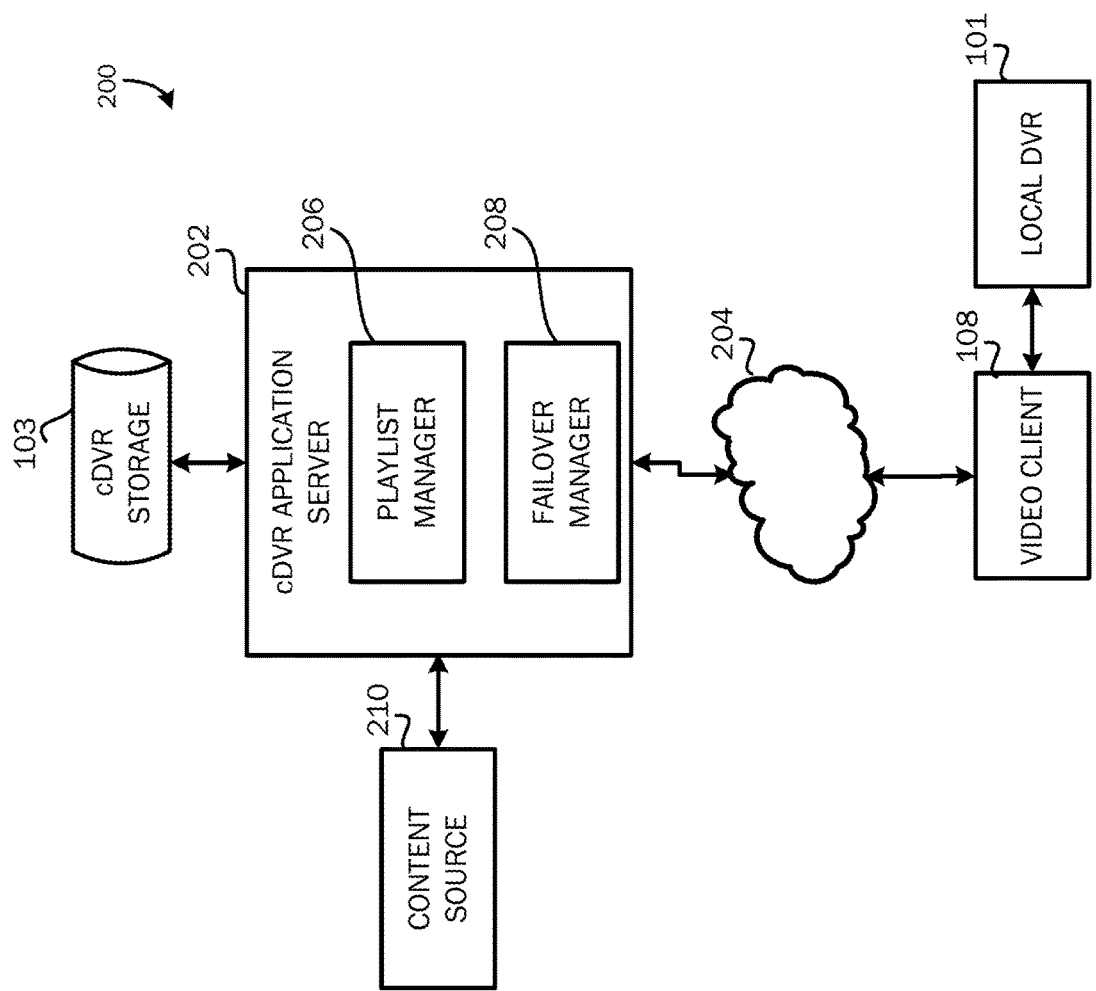
FIG. 2 is a block diagram that illustrates a high-level overview of an exemplary DVR failover system according to an embodiment.

FIG. 2 is a block diagram that illustrates a high-level overview of an exemplary DVR failover system 200 according to an embodiment. As shown in FIG. 2, video client 108 is communicatively coupled to local DVR 101 and network 204 via wired and/or wireless couplings. In one embodiment, video client 108 can be integrated with DVR 101, STB 118, and/or some other component. Video client 108 is configured to record content or content items delivered over a physical network (see FIG. 1 or FIG. 6 as examples), such as a content delivery network or service provider network for example. Video client 108 is operable to record and/or playback content to and from local DVR 101 and/or cDVR storage 103, but is not so limited.

According to an embodiment, requests for content and/or use of cDVR storage 103 are handled by cDVR application server 202 which operates in part to locate, access, and/or retrieve content from one or more content or other sources. The cDVR application server 202 uses the cDVR storage 103 as either a primary or backup storage medium to record and/or recall content for video clients 108. As shown in FIG. 2, cDVR application server 202 communicates with video client 108 via network 204. The cDVR application, server 202 of an embodiment includes a playlist manager 206 and a failover manager 208, but is not so limited.

The cDVR application server 202 uses the playlist manager 206 to manage one or more content item playlists which may include one or more playlists associated with local DVR 101 and/or one or more playlists associated with cDVR storage 103. The playlist manager 206 is configured to synchronize local and/or remote content item playlists so that content titles stored at local DVR 101 may also be stored at cDVR storage 103 and vice versa. The playlist manager 206 is also configured to control automatic playlist copy and/or synchronization operations. For example, as part of a failover process, playlist manager 206 can be automatically used to copy a content item to cDVR storage 103 when a user has opted to record the same content item to local DVR 101. Playlist manager 206 is further configured to generate shared playlists that synchronize content and/or content titles between the local DVR 101, cDVR storage 103, and/or other storage media.

The cDVR application server 202 can use failover manager 208 and/or failover preferences/settings to designate that local DVR 101 or another recording and playback device is to be used as a failover device (e.g., backup) when cDVR storage 103 (e.g., primary) is inoperable or otherwise inaccessible. Likewise, if the local DVR 101 is inoperable or otherwise inaccessible, failover manager 208 can use the failover preferences/settings to designate that cDVR storage 103 is to be used for failover operations and automatically used by the video client 108 to record content items and/or playback recorded content items. Failover manager 208 of one embodiment can be configured to convey messages, such as hard drive error messages, sector error messages, etc. to video client 108, EPG interface 122, and/or some other component for display via a display device or for playing aloud. Failover manager 208 is also operable to generate a message that enables a user to elect whether to use a failover device/system when a primary recording and/or playback device is inoperable or otherwise unable to provide recording and/or playback operations.

Content source 210 includes linear and non-linear content items available to users via a service provider network or other source for populating in a playlist and/or recording list by the playlist manager 206 or local DVR 101. For example, broadcasts of television programs and live events carried on a content provider network, which may be temporarily spooled or cached on computer-readable storage media or directly transmitted over a physical network, are included as content source 210. Video client 108 and/or playlist manager 206 can be used to designate which content items from content source 210 are to be stored at local DVR 101 and/or cDVR storage 103. Video client 108 can also request cDVR application server 202 to locate content items from other content sources when they are not available at content source 210.

The cDVR storage 103 comprises computer readable storage media, such as one or more redundant hard disk drives for example, on which content from the content source 210 can be recorded as part of a failover mode or when cDVR storage 103 is designated as a primary recording source. The cDVR storage 103 may comprise a distributed system of memory storage devices and servers or may be provided as a dedicated storage device for a given user. The failover manager 208 of an embodiment operates to manage the cDVR storage 103 by allocating specific resources and storage space to a given consumer in a distributed system, by allocating access to specific recordings by lists of users who requested to record a given content item, by allocating a cDVR device/system for a given user or group of users, etc.

In various aspects, the video client 108 includes complex programming instructions embodied in a computer readable medium, such as a computer program product for example, that can be executed using a processor of a network interface device, an endpoint device or system, and/or some other component. For example, the video client 108 can be stored in a memory storage device associated with STB 118, local DVR 101, cDVR application server 202, etc. as part of providing a failover mechanism and/or failure mode detectability described herein.

According to an embodiment, when the DVR 101 is unable to perform a record and/or playback operation associated with a content item, the video client 108 can send a message to cDVR application server 202 requesting use of failover services and use of cDVR storage 103 for recording and/or playback operations. If the desired content item is not stored in cDVR storage 103, cDVR application server 202 can search the content source 210 or some other source for the desired content item and, once located, store the content item to cDVR storage 103 or stream the content item directly from content source 210 or some other source.

Accordingly, when a user requests a recorded content item to be played back from cDVR storage 103, the cDVR application server 202 retrieves the recorded content item from cDVR storage 103 before transmitting to the video client 108. If there is an interruption that affects a network connection, cDVR application server 202 can store the time of the interruption so that recording and/or playback operations may be resumed from the time that recording or playback of an associated content item was interrupted. As described above, failure options may include failover to a backup cloud-based recording and/or playback device/system and or to a backup local recording and/or playback device system when a primary recording and/or playback device/system is unavailable or unable to perform recording and/or playback operations.

Figure 3:
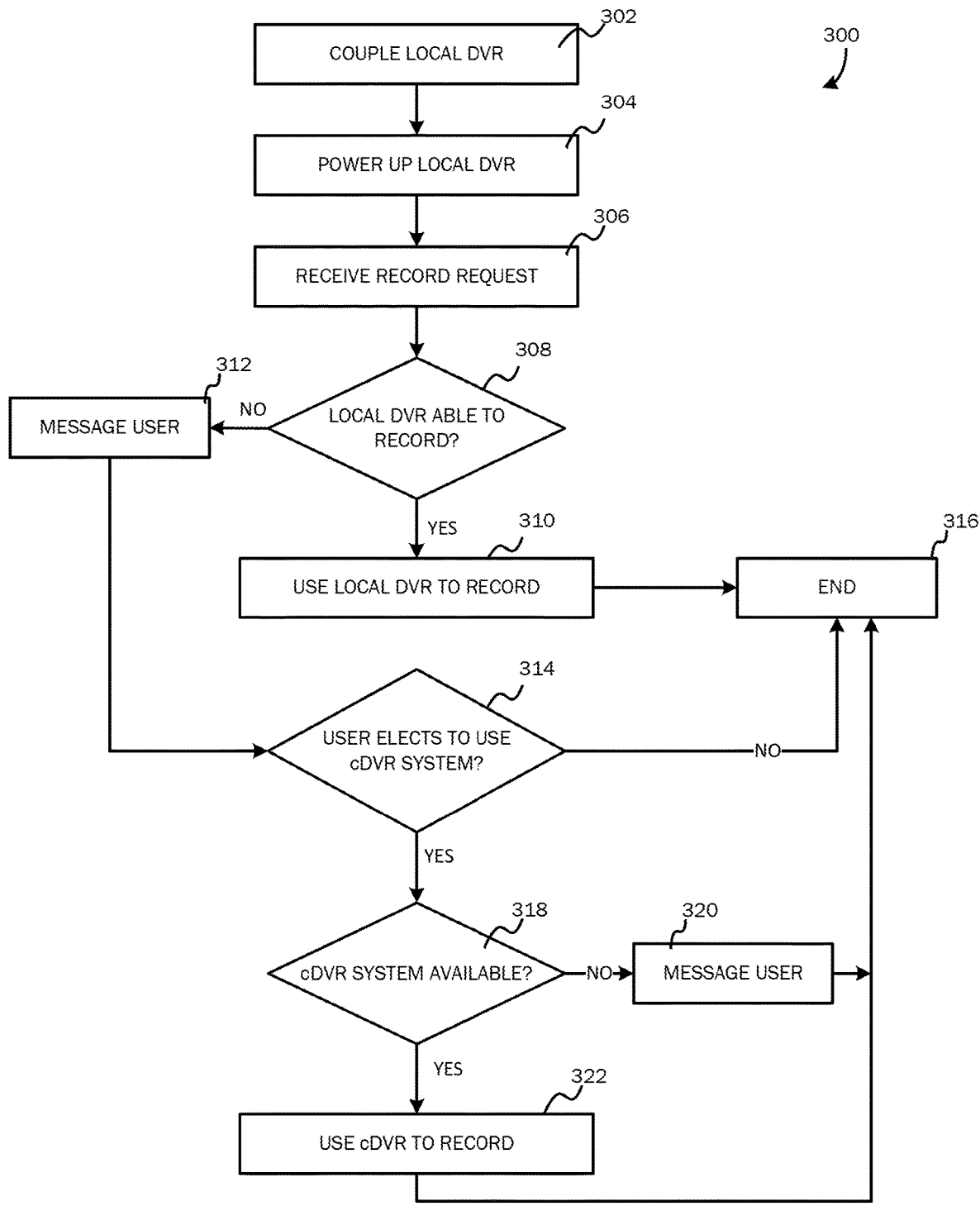
FIG. 3 is a flow diagram that depicts a process of using a local DVR and/or a remote DVR or cDVR system to record one or more content items according to an embodiment.

FIG. 3 is a flow diagram that depicts a process 300 of using a local DVR 101 and/or a remote or cDVR system 102 to record one or more content items according to an embodiment. At 302, the process 300 starts when a user couples a DVR to consumer premise equipment in preparing to use the DVR locally for recording operations. Local DVR 101 includes local storage, such as hard disk drive storage for example, for use in storing content items locally with local DVR 101. Current STB devices typically include hard disk storage and DVR functionality for use as local DVR 101 in storing recorded content items, such as television programming and/or other types of content items. A local DVR 101 can also be implemented as a standalone component, coupled to an STB 118, TV 116, antenna, and/or other signal conveyance mechanism.

At 304, the process 300 powers up recording components, such as local DVR 101 for example, and/or connects to cDVR system 102, in preparing to record one or more content items. At 306, the process 300 receives a request to record one or more content items to store at local DVR 101 and/or other storage medium. For example, a user can use a remote control or other input mechanism to locate a content item, such as a television program or live event for example, in an electronic program guide and actuate a record button or other recording control to record the content item to store at local DVR 101 or other physical storage medium. As another example, a user may be watching a television show or a live event and presses record or otherwise activates a record operation to record to local DVR 101 for viewing at some later time.

If the local DVR 101 is able to perform the record operation at 308, the process 300 proceeds to 310 and records the content item to the local DVR 101 before ending at 316. If the local DVR 101 is unable to perform the record operation at 308, the process 300 proceeds to 312 and provides a message to the user that the local DVR 101 is unable to store the content item locally and/or asks whether the user would like to store the content item using a cloud-based system, such as cDVR system 102 for example. In one embodiment, EPG interface 122 is configured to generate and provide a message to the user when the local DVR 101 and/or cDVR system 102 are unable to record content items.

If the user does not elect to use the cDVR system 102 at 314, the process 300 ends at 316. In one embodiment, the process 300 at 116 provides a message to the user with remediation steps as part of determining why the local DVR 101 is unable to perform the record operation. In one embodiment, the EPG interface 122 is configured to provide the message with remediation information to the user. For example, the message can guide the user to local DVR diagnostic tools that enable a user to determine a point of failure, such as when the local DVR 101 has a bad sector or faulty hard drive. If the user elects to use the cDVR system 102 at 314, the process 300 proceeds to 318 and determines whether the cDVR system 102 is available. If the cDVR system 102 is not available at 318, the process 300 at 320 provides a message to the user regarding remediation steps as part of determining why the cDVR system 102 is unavailable and the process ends at 316. For example, the EPG interface 122 can be configured to provide a message that asks the user to check cables and/or other components that enable network connectivity and/or may be preventing communication with the cDVR system 102.

If the cDVR system 102 is available at 318, the process 300 proceeds to 322 and uses the cDVR system 102 to record the content item before the process 300 ends at 316. At 322, the process 300 of an embodiment refreshes an electronic program interface display to display content items and/or other information associated with the cDVR system 102. For example, different content items may have been stored using the cDVR system 102 as compared to the local DVR 101. In one embodiment, the process 300 automatically records a content item to cDVR at or about the same time that the content item is recorded to the local DVR 101 at 310. According to such an embodiment, the process 300 proactively stores content items locally and/or remotely in order to reduce an amount of time required to locate a content item to record with the cDVR system 102.

Figure 4:
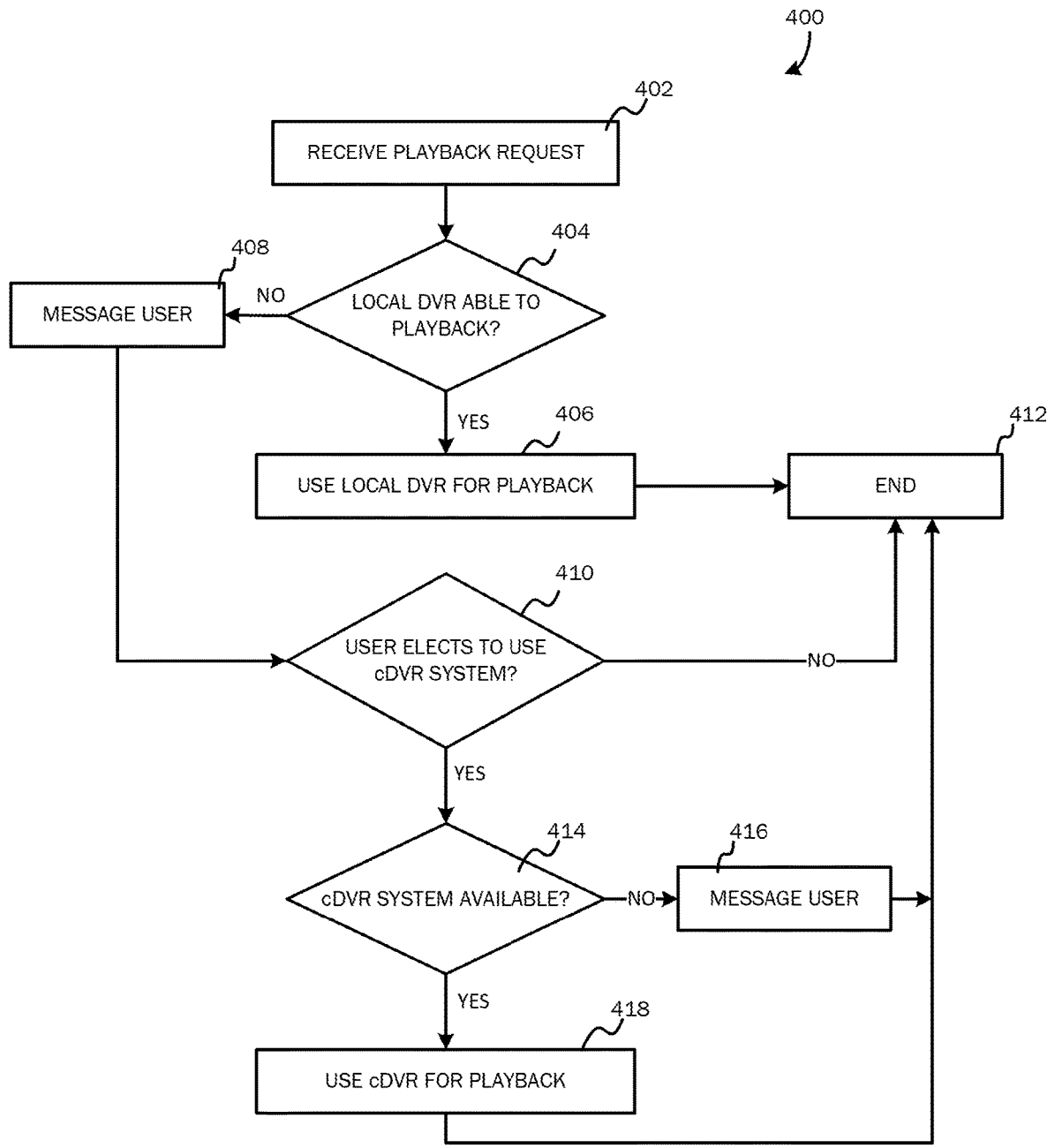
FIG. 4 is a flow diagram that depicts a process of using a local DVR and/or a remote DVR or cDVR system to playback one or more content items according to an embodiment.

FIG. 4 is a flow diagram that depicts a process 400 of using a local DVR 101 and/or a remote or cDVR system 102 to playback one or more content items according to an embodiment. For this embodiment, it is assumed that a local DVR 101 is coupled to consumer premise equipment and powered on in preparing to use the local DVR 101 for playback operations. As discussed above, local DVR 101 includes local storage, such as hard disk drive storage for example, for use in storing content items locally. It will be appreciated that the shorter communication paths typically associated with local DVR 101 require less processing time when performing recording and/or playback operations as compared to the longer communication paths typically associated with a remotely located DVR system. As discussed above, local DVR 101 can be implemented as a standalone component, coupled to a STB 118, TV 116, antenna, and/or other signal conveyance system.

At 402, the process 400 receives a request to playback a recorded content item from local DVR 101 or other storage medium. For example, a user may have recorded a live event and presses play or otherwise activates a playback operation to play the recorded (live) event from the local DVR 101. As another example, a user can use a remote control or other input mechanism to navigate an electronic program guide or other menu and locate a recorded content item stored at local DVR 101 and actuate a play button or other playback control to playback a recorded content item. If the local DVR 101 is able to perform the playback operation at 404, the process 400 proceeds to 406 and plays the recorded content item from the local DVR 101 and then ends at 412.

If the local DVR 101 is unable to perform the playback operation at 404, the process 400 proceeds to 408 and provides a message to the user that the local DVR 101 is unable to perform playback operations and/or asks whether the user would like to use a cDVR system 102 for playback operations. In one embodiment, EPG interface 122 is configured to generate and provide an error message to the user when the local DVR 101 is unable to playback and/or record content items. As will be appreciated, when available, local DVR 101 can be designated as a default/primary playback and/or recording device due in part to a reduced amount of latency and/or other hardware resources required when recording and/or playing content items locally as compared to remotely.

If the user does not elect to use the cDVR system 102 at 410, the process 400 ends at 412. In one embodiment, the process 400 at 412 operates to provide a message to the user with remediation steps as part of determining why the local DVR 101 is unable to perform a playback operation. In one embodiment, the EPG interface 122 is configured to provide the message with remediation information to the user. For example, the message can guide the user to local DVR diagnostic tools that enable a user to determine a point of failure, such as when the local DVR 101 has a bad sector or faulty hard drive. If the user does elect to use the cDVR system 102 at 410, the process 400 proceeds to 414 and determines whether the cDVR is available for playback operations. If the cDVR system 102 is not available at 414, the process 400 at 416 provides a message to user regarding remediation steps as part of determining why the cDVR system 102 is unavailable and the process ends at 412. For example, the EPG interface 122 can be configured to provide a message that asks the user to check one or more components (e.g., cables, modem, etc.) that provide network connectivity and/or may be preventing communication with the cDVR system 102.

If the cDVR system 102 is available at 414, the process 400 proceeds to 418 and, after determining that the recorded content item is available in cDVR storage 103, the video client 108 plays back the recorded content item via the cDVR system 102 before the process 400 ends at 412. If the content item is not stored at the cDVR system 102, the process 400 at 414 operates to query one or more content sources 130 or other locations to locate the content item for storing and/or playback via the cDVR system 102 and/or for playback from another source or location. For example, different content items may have been stored to the cDVR system 102 as compared to local DVR 101. In one embodiment, the process 400 automatically locates and/or stores a desired content item to cDVR 102 at or about the same time that the desired content item is stored at the local DVR 101.

Figure 5:
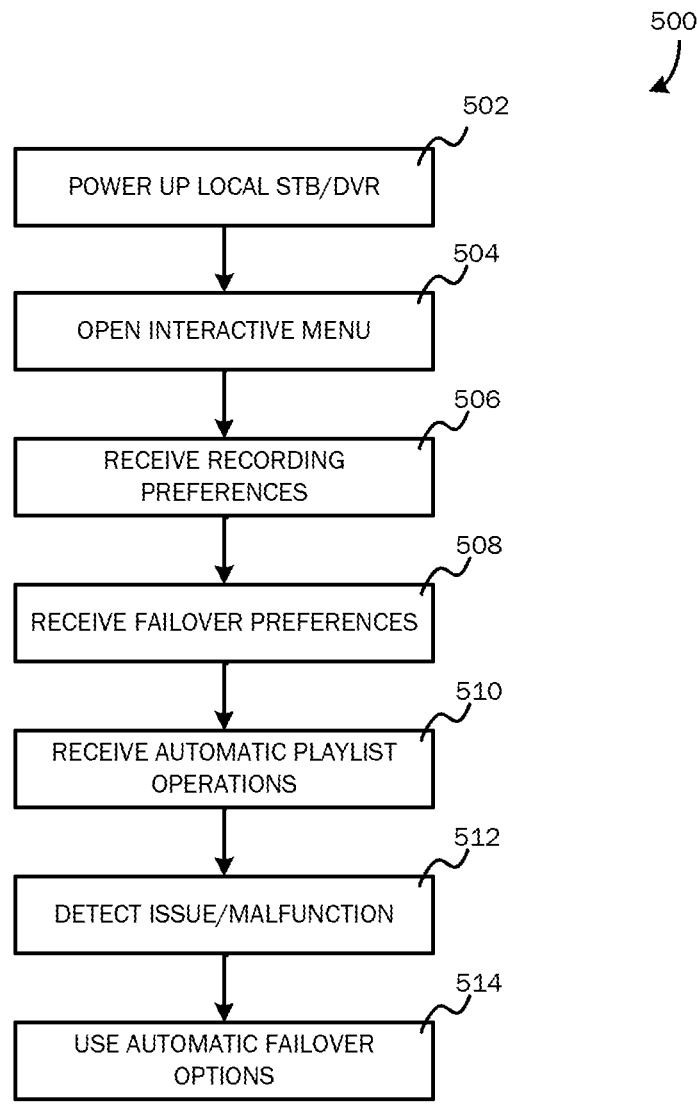
FIG. 5 is a flow diagram of a process that operates to failover from a primary DVR device/system to a backup DVR device/system according to an embodiment.

FIG. 5 is a flow diagram of a process 500 that operates to failover from a primary DVR device/system to a backup DVR device/system, according to an embodiment. For example, the process 500 can be used to failover from local DVR 101 to cDVR system 102 or another backup device/system and/or failover from cDVR system 102 to local DVR 101 or another backup device/system. The process 500 begins at 502 when a user powers up local DVR 101. At 504, the process 500 receives an input control to open an interactive menu associated with the local DVR 101 for display on an associated display. At 506, the process 500 receives additional control inputs via the interactive menu as part of setting preferences associated with the local DVR 101 including failover options when the local DVR 101 or another recording and/or playback device/system is unable to perform recording and/or playback operations. For example, the process 500 at 506 can receive user preferences regarding programs to record and at what time/day using the local DVR 101 as a primary recording device for recording operations. In one embodiment, local DVR 101 is automatically designated as the primary recording and playback device as a default setting.

At 508, the process 500 receives control inputs via the interactive menu as part of setting preferences associated with the cDVR system 102 including failover options when the local DVR 101, cDVR system 102, and/or another recording and/or playback device/system is unable to perform recording and/or playback operations. For example, when a failure mode is detected and/or the local DVR 101 is unable to playback or record content items, the cDVR system 102 can be designated as the primary recording and playback device and automatically used to record and playback recorded content items from the cloud. Failover preferences can also be designated such that a local DVR 101 or other recording and playback device can be used as a failover device when the cDVR system 102 is unable to provide recording and/or playback operations. In one embodiment, recording, playback, and/or playlist settings associated with a primary recording and/or playback device/system can be automatically transferred for use with a backup recording and/or playback device/system.

At 510, the process 500 receives control inputs via the interactive menu as part of setting automatic playlist copy and/or synchronization operations. For example, a user can designate that the cDVR system 102 is to maintain the same content titles as stored at the local DVR 101 which can be managed using a shared playlist. For example, a shared playlist can be setup and used to add new titles that are recorded at the local DVR 101 and/or remove titles from the shared playlist that have been viewed or not viewed for some designated period of time. In one embodiment, the process 500 at 510 can include automatic search and/or copy functions that search for content titles that are stored or designated for recording at local DVR 101 but not currently stored at cDVR system 102 and vice versa. Once the content items are located, the process 500 can operate to store the content items at the cDVR system 102 or create a link to the content items as part of failover and/or backup configuration settings.

At 512, the process 500 operates to detect an issue or malfunction associated with an inability of the local DVR 101 or other recording and playback device to perform recording and/or playback operations. As one example, the process 500 at 512 can use an internal DVR, 0/S, or other diagnostic tool to ascertain whether the local DVR 101 has experienced a sector failure or a hard disk drive failure. As another example, a detector circuit (e.g., an Application-Specific Integrated Circuit (ASIC)) can be used to detect hard disk failures and/or a read/write error module can be used to detect sector failures. For example, an ASIC power detection circuit can be used to detect a voltage drop or a lack of electric current when a hard disk fails or becomes inoperable for some reason and output a failure detection signal associated with the hard disk issue. As yet another example, the process 500 at 512 can use network connectivity tools to ascertain whether a bad or limited network connection exists or whether there is some other issue or component affecting use of an associated cDVR system 102.

In one embodiment, upon detecting a failure, the process 500 at 512 operates to record a time, such as a playback time or recording time for example, of an issue or malfunction associated with a detected failure mode. The recorded time of failure can be used as part of an automatic failover process to use a different recording and/or playback device/system to playback a content item from a time of failure as part of providing a seamless viewing experience that utilizes a primary DVR device/system and at least one backup DVR device/system. A user may be provided, with an option to resume playback from the time of failure or start from the beginning of the content item or some other desired time.

Before switching to a backup recording and/or playback device, the process 500 can be configured to provide an option for allowing a user to elect and/or control use of a backup device/system. For example, a subscriber user interface (e.g., electronic program guide or other service provider menu system) can be configured to display a message that informs the user of a problem with a primary recording and/or playback device/system and ask if the user would like to use a backup device/system (e.g., a cloud-based system, backup local device, etc.) for recording and/or playback operations. If the user elects to use a backup device/system, the process 500 at 514, refers to the automatic failover options configured at 508 to automatically resume recording and/or playback operations using a designated backup device/system. For example, the automatic failover options may utilize a second local DVR 101 that is primarily used as a backup upon failure of a primary local DVR 101 or other recording and playback device. Additionally, the process SOO can failover from a cDVR system 102 to a local DVR 101 or other recording and playback device when the cDVR system 102 is unavailable or inoperable. The configured failover options can designate many different scenarios and failover options according to a particular device/system architecture and/or user preferences.

Figure 6:
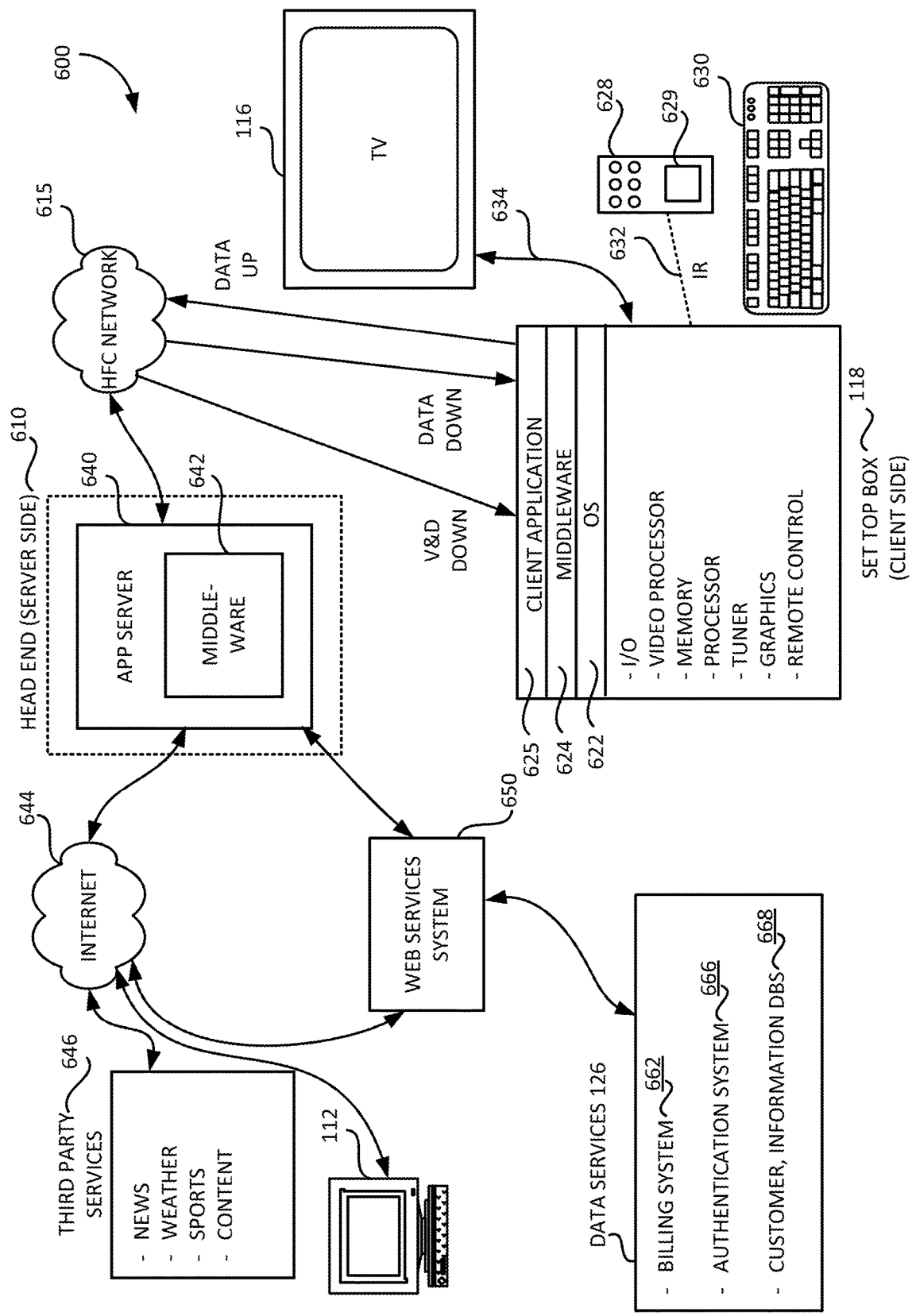
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for providing failover functionality described herein. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the STB 118 and the application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a STB 118 functionally connected to a customer receiving device, such as the television set 116. As described above, STB 118 can include DVR functionality including one or more hard disk drives. As is understood by those skilled in the art, modern CATV systems 600 may provide a variety of services across the HFC network 615 including traditional digital and analog video programming, telephone services, high speed Internet access, video-on-demand, and services.

On the client side of the CATV system 600, digital and analog video programming and digital and analog data are provided to the customer television set 116 via the STB 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smart phone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below. The STB 118 also includes an operating system 622 for directing the functions of the STB 118 in conjunction with a variety of client applications 625. For example, video client 108 may generate a signal for STB 118 to provide a failure alert to enable a failover operation.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications and operating systems 622 that allow client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the STB 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data, from the client-side of the CATV system 600 to the server-side of the CATV system 600 via the HFC network 615 via one data uplink.

The video/data downlink is an "in band" downlink that allows for digital and analog video and data signaling from the server side of the CATV system 600 through the HFC network 615 to the STB 118 for use by the STB 118 and for distribution to the television set 116. The "in band" signaling space operates at a relative high frequency, e.g., between 54 and 1000 megahertz and the signaling space is generally divided into 6 megahertz channels which may be transmitted as a single analog signal or a greater number (e.g., ten) of digital signals.

The data downlink and the data uplink, illustrated in FIG. 6, between the HFC network 615 and the STB 118 comprise "out of band" data links. As is understand by those skilled in the art, the "out of band" frequency range is generally at a lower frequency than "in band" signaling. For example, the "out of band" frequency range may be between zero and 54 megahertz. Data flow between the STB 118 and the server-side application server 640 is typically passed through the "out of band" data links. Alternatively, an "in band" data carousel may be positioned in an "in band" channel into which a data feed may be processed from the application server 640 through the HFC network 615 to the STB 118. Operation of data transport between components of the CATV system 600, described with reference to FIG. 6, is well known to those skilled in the art.

The head end 610 of the CATV system 600 is positioned on the server-side of the CATV system and includes hardware and software systems responsible for originating and managing content for distributing through the HFC network 615 to client-side STBs 118 for presentation to customers. As described above, a number of services may be provided by the CATV system 600, including digital and analog video programming, interactive television services, telephone services, video-on-demand services, targeted advertising, and/or automated failover functionality.

The application server 640 can be configured as a computing system operative to assemble and manage data sent to and received from the STB 118 via the HFC network 615. As described above, the application server 640 includes a middleware layer 642 for processing and preparing data from the head end of the CATV system 600 for receipt and use by the client-side STB 118. For example, the application server 640 via the middleware layer 642 may obtain content items from third-party services 646 via the Internet 644 for transmitting to a customer through the HFC network 615, the STB 118, and/or recording by a local DVR 101 or remote DVR 102. For example, content metadata a third-party content provider service may be downloaded by the application server via the Internet 644. When the application server 640 receives the downloaded content metadata, the middleware layer 642 may be utilized to format the content metadata for receipt and use by the STB 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the STB 118 through the HFC network 615 where the XML-formatted data may be utilized by a client application 625 in concert with the middleware layer 624, as described above, As should be appreciated by those skilled in the art, a variety of content may be obtained by the application server 640 via distributed computing environments such as the Internet 644 for provision to customers via the HFC network 615 and the STB 118. According to embodiments, client application 640 may include the video client 108 described herein.

The data services 126 include a number of services operated by the services provider of the CATV system 600 which may include profile and other data associated with a given customer. A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include device information and/or failover options and/or other information used to provide automated failover operations. As should be understood, this information may be stored in a variety of disparate databases operated by the cable services provider.

Web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by an STB 118 or other identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. An authentication system 666 may include information such as secure user names, subscriber profiles, subscriber IDs, and passwords utilized by customers for access to network services. As should be understood by these skilled in the art, the disparate systems 650, 662, 666, 668 may be integrated or provided in any combination of separate systems, wherein FIG. 6 shows only one example.

Figure 7:
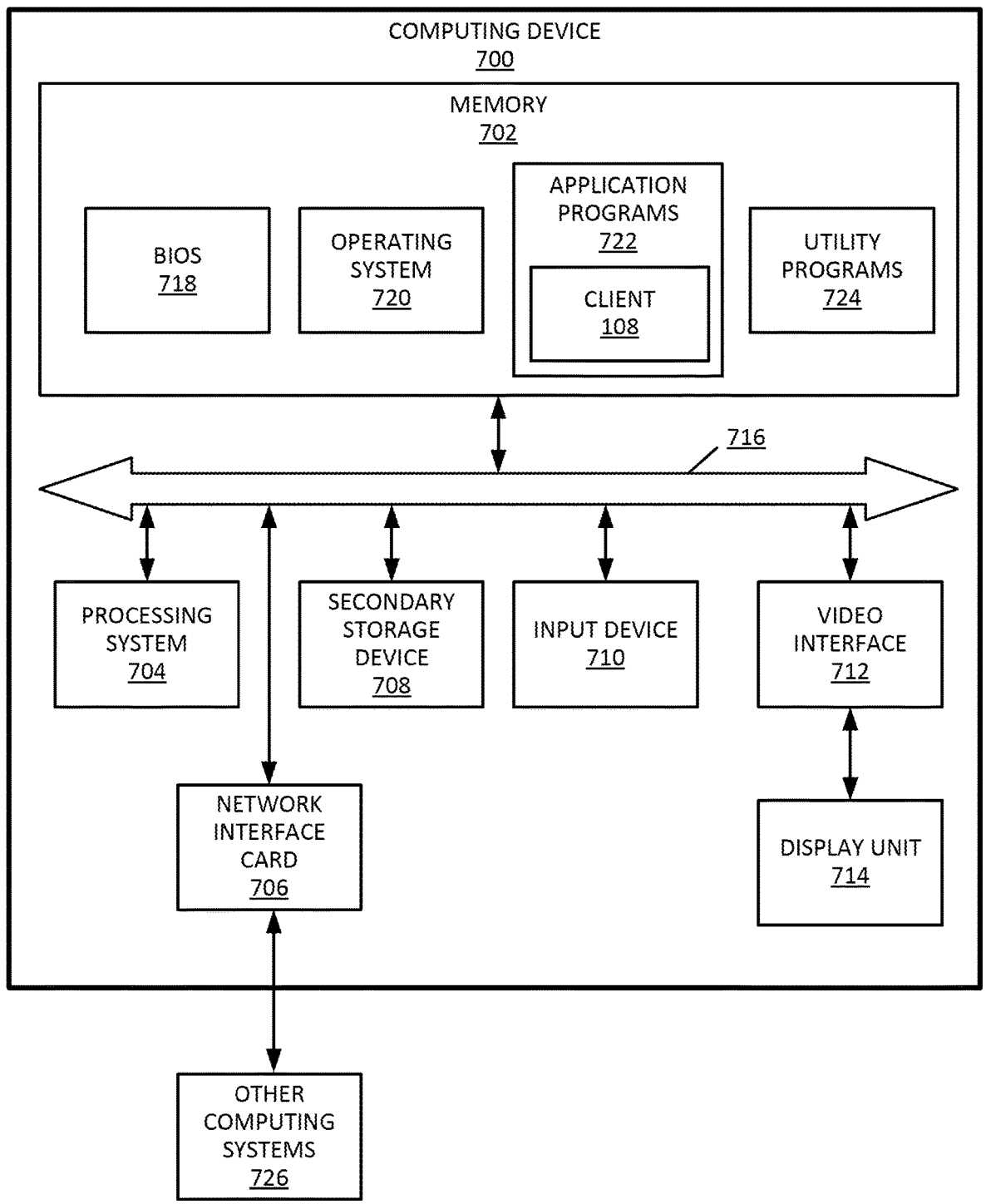
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components 110, 112, 114, 116, 118, 120 of system 100 may be implemented using one or more computing devices like the computing device 700. It should be appreciated that in other embodiments, components 110, 112, 114, 116, 118, 120 of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, video client 108 may be stored locally on computing device 700. Memory 702 thus may store the computer-executable instructions that, when executed by processor 704, cause video client 108 to generate a signal associated with a detected failure mode and/or automatically perform one or more failover operations as described above.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM) DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the video client 108. The memory 702 also stores one or more utility programs 724 that, when executed by the processing system 704, cause the computing device 700 to provide utilities to other software programs.

FIGS. 8A-8B illustrate a suitable mobile computing environment, for example, a mobile computing device or smart phone 110, a tablet personal computer 114, a laptop computer 112, and the like, with which embodiments may be practiced. The mobile computing device 800 is illustrative of any suitable device operative to send, receive and process wireless communications. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the device 800, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, video client 108 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device location.

Although described herein in combination with mobile computing device 800, in alternative embodiments aspects may be used in combination with any number of computer systems, such as in desktop environments, laptop or notebook computer systems, multiprocessor systems, microprocessor based or programmable consumer electronics, networked PCs, mini computers, main frame computers and the like. Embodiments may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
   a cDVR system that includes cDVR storage to store one or more content items at one or more network locations, the cDVR system being a cloud-based digital video recorder;
   a local DVR to receive record commands and playback commands from a video client to record content items and playback the content items locally, and to determine a recorded time of failure when the local DVR is inoperable for recording or playing back the content items locally; and
   a server to receive a request from the video client to use the cDVR system for a recording operation or a playback operation associated with a content item when the local DVR is inoperable for recording or playing back content items, wherein the server operates further to:

determine whether the cDVR system is online and the local DVR is authorized to use the cDVR system; and when it is determined that the cDVR system is online and the local DVR is authorized to use the cDVR system, provide a user interface to display a message that the local DVR is inoperable and query a user to select the cDVR system, and in response to receiving a selection of the cDVR system, retrieve the recorded time of failure from the local DVR and use the recorded time of failure to resume the recording operation at the cDVR system to record only a portion of the content item, wherein recording, playback, and playlist settings associated with the local DVR are automatically transferred for use with the cDVR system when the local DVR is inoperable.

2. The system of claim 1, wherein the server receives requests from a set-top box (STB) UI to locate one or more content item titles stored at one or more network locations that match one or more content item titles stored at the local DVR.

3. The system of claim 1, wherein the server operates to message a user that the local DVR is unavailable and to check an associated hard drive of the local DVR.

4. The system of claim 1, wherein the server maintains a shared content item playlist associated with the local DVR and cDVR system.

5. The system of claim 1, wherein the server operates to store a time associated with when the local DVR is inoperable for playing back content items.

6. The system of claim 1, wherein the server uses failure detection information to automatically failover to a local or remote backup DVR system.

7. The system of claim 1, wherein the server operates further to:
when it is determined that the cDVR system is online and the local DVR is authorized to use the cDVR system, use the recorded time of failure to resume the playback operation to playback only a portion of the content item from the recorded time of failure.

8. The system of claim 7, wherein the server operates further to:
retrieve the content item from a remote DVR and store the content item in the cDVR storage at the same time when the content item is stored in the local DVR.

9. The system of claim 1, wherein the server operates further to:
determine whether the content item is stored in the cDVR storage; and
when it is determined that the content item is not stored in the cDVR storage, stream the content item directly from a content source to the local DVR.

10. The system of claim 1, wherein the cDVR storage is configured as a redundant array of computer readable storage devices.

11. The system of claim 1, wherein the message is displayed on an electronic program guide (EPG) interface that uses guide data to generate an EPG display that includes a channel lineup, menu options for video on demand, and DVR settings.

12. The system of claim 1, wherein when the video client records and plays content from the local DVR, a first user interface is displayed, when the video client records and plays content from the cDVR system, a second user interface is displayed, and wherein the first and second interfaces are distinct user interfaces.

13. A method comprising:
using a cDVR system that includes cDVR storage to store content items at one or more network locations, the cDVR system being a cloud-based digital video recorder;
using a local DVR to receive record commands and playback commands from a video client to record content items and playback content items locally, and to determine a recorded time of failure when the local DVR is inoperable for recording or playing back the content items locally; and
using a server to receive a request to use the cDVR system for a recording operation or a playback operation associated with a content item when the local DVR is inoperable for recording or playing back content items, wherein the server operates further to:
determine whether the cDVR system is online and the local DVR is authorized to use the cDVR system; and
when it is determined that the cDVR system is online and the local DVR is authorized to use the cDVR system, provide a user interface to display a message that the local DVR is inoperable and query a user to select the cDVR system, and in response to receiving a selection of the cDVR system, retrieve the recorded time of failure from the local DVR and use the recorded time of failure to resume the recording operation at the cDVR system to record only a portion of the content item, wherein recording, playback, and playlist settings associated with the local DVR are automatically transferred for use with the cDVR system when the local DVR is inoperable.

14. The method of claim 13, further comprising using the server to receive requests from a set-top box (STB) UI to request one or more content item titles stored at one or more network locations that match one or more content item titles stored at the local DVR.

15. The method of claim 13, further comprising using the server to manage a shared content item playlist associated with the local DVR and cDVR system.

16. A system comprising:
a cDVR system that includes cDVR storage to store one or more content items at one or more network locations;
a video client to generate record commands to record the one or more content items and playback commands associated with the one or more content items, wherein the video client uses an EPG interface to communicate failover messages; and
a local DVR to receive commands from the video client to record the content items and playback the content items locally, and to determine a recorded time of failure when the local DVR is inoperable for recording or playing back the content items locally,
wherein the video client receives a failure mode message from the local DVR when there is a failure and conveys the failure mode message to a user and queries the user to select the cDVR system when the local DVR is inoperable;
wherein the video client operates to use the EPG interface to transmit the failure mode message and to automatically failover to the cDVR system for a playback operation in response to receiving a selection of the cDVR system when the local DVR is inoperable for playing back content items locally, the cDVR system being a backup cloud-based recording device, and
wherein the video client operates further to use the recorded time of failure to resume playback of only a portion of the content item from the cDVR storage when the local DVR is inoperable for playing back content items locally, and wherein recording, playback, and playlist settings associated with the local DVR are automatically transferred for use with the cDVR system when the local DVR is inoperable.

17. The system of claim 16, wherein the video client uses a shared content item playlist associated with the local DVR and cDVR system.

18. The system of claim 17, wherein the video client stores a time associated with when the local DVR is inoperable for playing back content items.

19. The system of claim 18, wherein the EPG interface provides one of a sector failure message or a hard disk failure message when the local DVR is inoperable for playing back content items.

20. The system of claim 16, wherein the video client operates to display a shared playlist associated with the cDVR UI when the cDVR system is online.

* * * * *